United States Patent
Joo et al.

(10) Patent No.: US 9,561,689 B2
(45) Date of Patent: Feb. 7, 2017

(54) KERF STRUCTURE FOR SNOW TIRE

(71) Applicant: HANKOOK TIRE CO., LTD., Seoul (KR)

(72) Inventors: Sang Tak Joo, Daejeon (KR); Sung Hee Youn, Seoul (KR); Su Jin Son, Seoul (KR); Myoung Joong Lee, Seoul (KR); Sang Moo Lee, Daejeon (KR); Mu Yeong Kim, Daejeon (KR)

(73) Assignee: Hankook Tire Co., Ltd., Seoul (KR)

( * ) Notice: Subject to any disclaimer, the term of this patent is extended or adjusted under 35 U.S.C. 154(b) by 212 days.

(21) Appl. No.: 14/512,872

(22) Filed: Oct. 13, 2014

(65) Prior Publication Data

US 2015/0107739 A1    Apr. 23, 2015

(30) Foreign Application Priority Data

Oct. 23, 2013   (KR) .......................... 10-2013-0126506

(51) Int. Cl.
    *B60C 11/12*    (2006.01)

(52) U.S. Cl.
    CPC .... *B60C 11/1218* (2013.04); *B60C 2011/1213* (2013.04)

(58) Field of Classification Search
    CPC ................ B60C 11/12; B60C 11/1204; B60C 2011/1213; B60C 11/1218; B60C 11/1222; B60C 11/124; B60C 11/1281
    USPC .......................... 152/209.18, 209.19, 209.21, 209.22, 152/209.25
    See application file for complete search history.

(56) References Cited

U.S. PATENT DOCUMENTS

2006/0169377 A1* 8/2006 Hashimoto ............. B60C 11/12
                                                         152/209.23
2011/0277896 A1* 11/2011 Nagayasu ........... B60C 11/1218
                                                         152/209.18

FOREIGN PATENT DOCUMENTS

JP          2001-1722    *  1/2001

* cited by examiner

*Primary Examiner* — Eric Hug
(74) *Attorney, Agent, or Firm* — Hamre, Schumann, Mueller & Larson, P.C.

(57) ABSTRACT

The present invention relates to a kerf structure for a snow tire, including a wave-shaped straight portion and an expansion portion formed expanding from the straight portion, wherein the expansion portion includes unit structures, on each of which central semi-sphere holes and polygonal forms around the semi-sphere holes form protrusions in opposite directions are formed continuously. According to the present invention, the kerf structure for a snow tire provides a symmetric shape, thereby securing uniform block rigidity regardless of the direction of the kerf, and the interlocking effect can be maximized through the combination of the protrusion shape of the polygonal shape and the embossing of the semi-sphere hole. In addition, according to the present invention, the tire performance on dry roads can be ensured by optimizing the collapse of the tire tread portion and the uniform performance of the traction can be maintained until the last stages of tread wear since the polygonal shape is maintained until the last stage of the wear even though the tire is worn.

5 Claims, 4 Drawing Sheets

KERF STRUCTURE FOR SNOW TIRE

CROSS-REFERENCE TO RELATED APPLICATION

This application claims under 35 U.S.C. §119A the benefit of Korean Patent Application No. 10-2013-0126506 filed on Oct. 23, 2013, the entire contents of which are incorporated herein by reference.

BACKGROUND OF THE INVENTION

Technical Field

The present invention relates to a kerf structure for a snow tire, and more particularly, to a kerf structure for a snow tire, wherein unit structures having central semi-sphere holes and protrusions formed in opposite directions by polygonal shapes around the semi-sphere holes are continuously formed, thereby more efficiently exhibiting an edge effect of the kerf during rotation on snow-covered roads, as well as accomplishing a friction force from a collapse of small blocks of a tread portion partitioned by the kerfs at an optimum level.

Description of the Related Art

Typically, pluralities of horizontal and longitudinal grooves are formed on the tread portion of a tire and kerfs of small grooves are formed on the block partitioned by the grooves so as to adjust the rigidity of the block.

In the case of a conventional snow tire, driving and braking performances on snow-covered roads are secured by the edge effect of the kerfs during rotation on snow-covered roads. However, the kerf adapted for this edge effect reduces the rigidity of the rubber tread block and degrades the performance of a snow tire on dry roads. FIG. 1 shows the general shape of such a conventional 2D kerf for a snow tire.

Hence, although a 3D kerf has been developed to maintain the rigidity of a tread block due to the constraints of a kerf in a vertical direction on the tire surface, in actuality, it has been difficult to maintain the optimal level of rigidity. FIG. 2 is a photograph showing that in such a snow tire having a conventional kerf, small blocks of a tread portion partitioned by the kerf are collapsed when the tire is in motion. As can be seen in FIG. 2, in a conventional kerf for a snow tire, either an excessively collapsed state A of a block occurs, or a phenomenon where the leading portion of the tire is entangled occurs, thereby decreasing a friction force caused from road surface.

The description provided above as a related art of the present invention is just for helping in understanding the background of the present invention and should not be construed as being included in the related art known by those skilled in the art.

SUMMARY OF THE INVENTION

The present invention proposes to solve the above-mentioned problems of the prior art and an object of the present invention is to provide a 3D kerf structure for a snow tire with an optimum strength, through which the gripping force as an original function of a kerf is maintained while ensuring a friction force from a collapse of small blocks of a tread portion partitioned by the kerfs at an optimum level.

In order to accomplish the above purpose, an aspect of the present invention relates to a kerf structure for a snow tire, which includes a wave-shaped straight portion and an expansion portion formed expanding from the straight portion and the expansion portion may include unit structures, on each of which the central semi-sphere holes and the polygonal shapes around the semi-sphere holes form the protrusions in opposite directions are continuously formed.

The unit structure consisting of an embossed polygonal shape and an engraved semi-sphere hole, and the unit structure consisting of an engraved polygonal shape and an embossed semi-sphere hole may be arranged alternatively.

The thickness t1 of the kerf at the straight portion may be in the range of 0.3 to 4.0 mm, and the thickness t2 of the kerf at the expansion section may be in the range of 0.5 to 5.0 mm which is 1.1 to 3 times the thickness t1 of the kerf at the straight portion.

The diameter of the semi-sphere hole D1 may be in the range of 1 to 10 mm and the length d1 of the polygonal section is in the range of 2 to 15 mm. A polygon-shaped portion of the kerf structure is formed to be inclined toward the semi-sphere hole in the center, here the slope a1 of the kerf at the polygonal section may be 10 to 70°.

BRIEF DESCRIPTION OF THE DRAWINGS

The above and other features of the present invention will now be described in detail with reference to exemplary embodiments thereof illustrated by the accompanying drawings which are given herein below by way of illustration only, and thus are not limitative of the present invention, and wherein.

Figure 1:
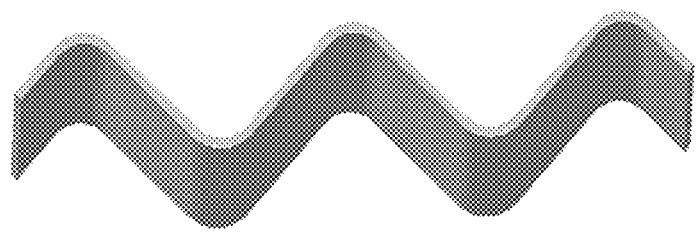
FIG. 1 shows the general shape of a conventional 2D kerf for a snow tire.
Figure 2:
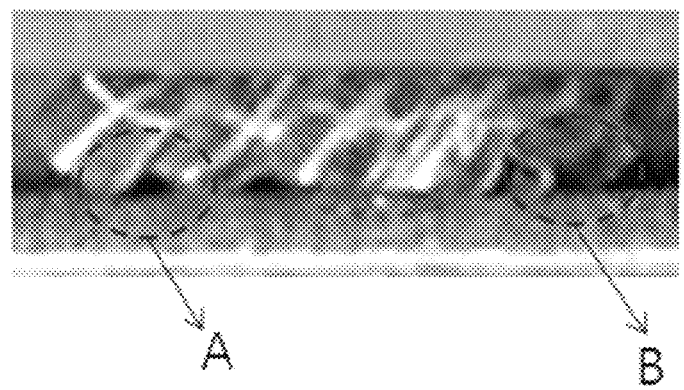
FIG. 2 is a photograph showing that in a snow tire to which a conventional kerf is adapted, small blocks of a tread portion partitioned by the kerf are collapsed when the tire is in motion.

It should be understood that the accompanying drawings are not necessarily to scale, presenting a somewhat simplified representation of various exemplary features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Reference will now be made in detail to various embodiments of the present invention(s), examples of which are illustrated in the accompanying drawings and described below. While the inventions(s) will be described in conjunction with exemplary embodiments, it will be understood that the present description is not intended to limit the invention (s) to those exemplary embodiments. On the contrary, the invention(s) is/are intended to cover the exemplary embodiments as well as various alternatives, modifications, equivalents, and other embodiments; which may be included within the spirit and scope of the invention as defined by the accompanying claims.

Hereinafter, a kerf structure for a snow tire is described in more detail with reference to the accompanying drawings according to a preferred embodiment of the invention. Further, in describing the present invention, detailed descriptions related to commonly known functions and configurations will be omitted.

The terminology used herein is for the purpose of describing particular embodiments only and is not intended to be limiting of the invention. As used herein, the singular forms "a," "an" and "the" are intended to include the plural forms as well, unless the context clearly indicates otherwise.

It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, components, and/or groups thereof.

The term "straight portion" in the present invention refers to a wave-shaped section comprising an upper portion of the kerf.

The term "expansion portion" in the present invention refers to a section in which the semi-sphere holes in the center of the kerf and the polygonal shapes around the semi-sphere holes form the protrusions in opposite directions to each other are formed.

The present invention relates to a kerf structure for a snow tire, which maintains the friction force from small blocks of a tread portion partitioned by kerfs at a snow tire while a block is collapsed at an optimum level, and at the same time maintains original functions of a kerf, such as having gripping force.

Figure 3:
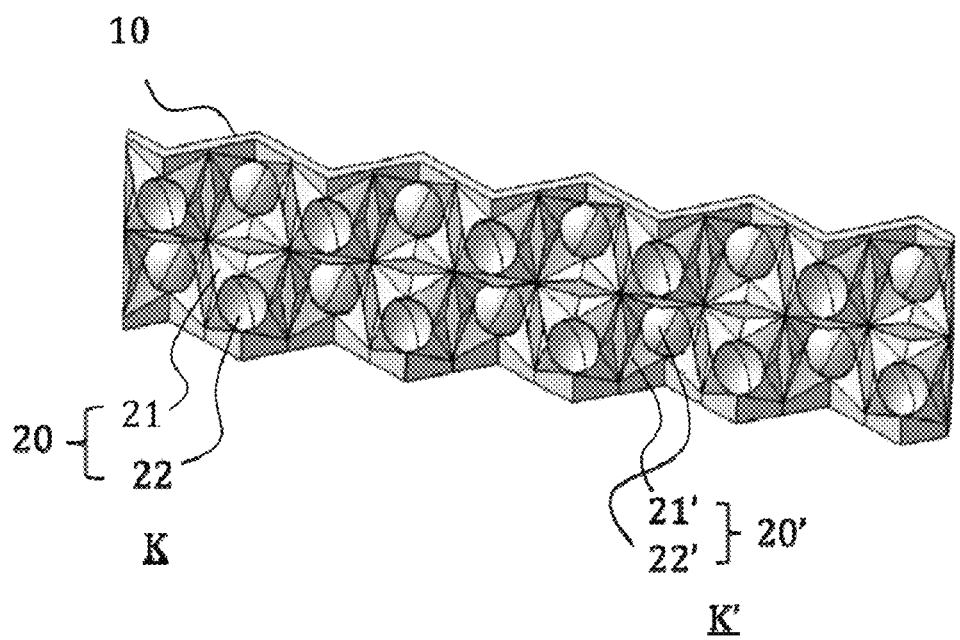
FIG. 3 is a perspective view of the kerf structure for a snow tire according to an embodiment of the present invention.
Figure 4:
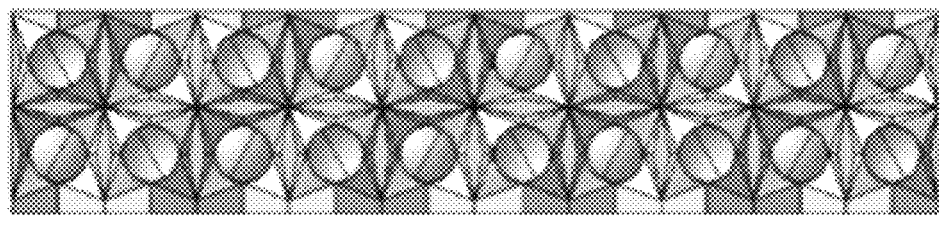
FIG. 4 is a front view, side view, and plan view of the kerf structure shown in FIG. 3.
Figure 4:
Figure 4:
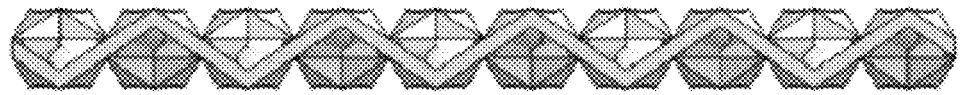
Figure 5:
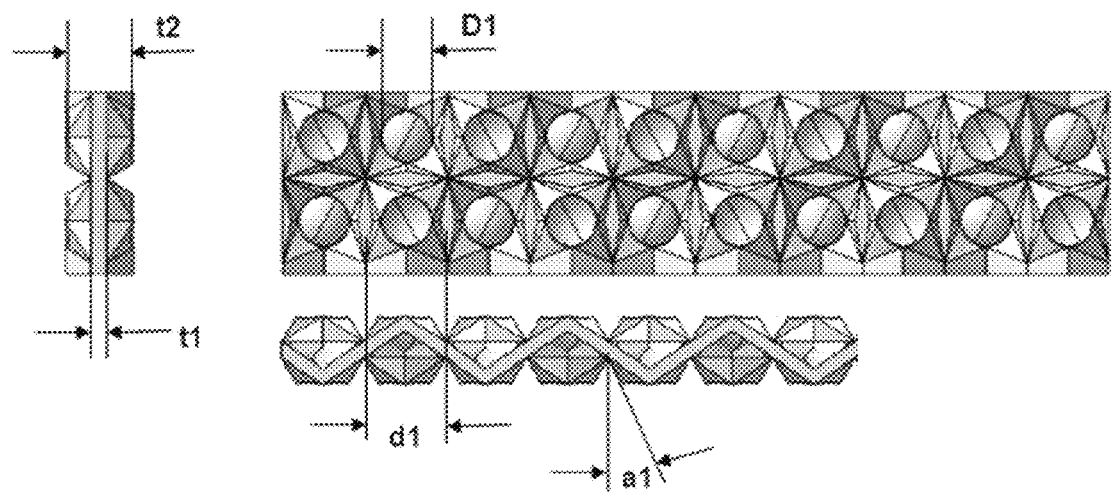
FIG. 5 is a drawing showing the dimensions for each part of the kerf structure shown in FIG. 3.
Figure 6:
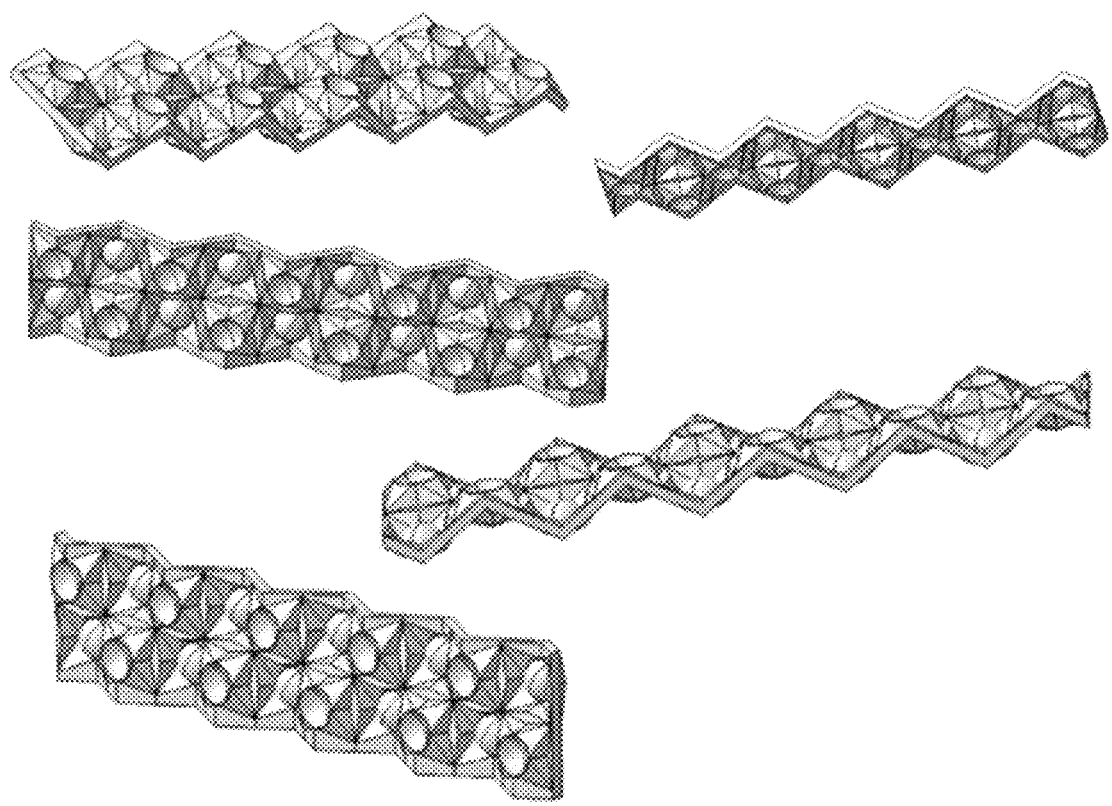
FIG. 6 is perspective views showing the kerf structure for the snow tire shown from various angles, according to an embodiment of the present invention.

FIG. 3 is a perspective view of the kerf structure for a snow tire according to an embodiment of the present invention, FIG. 4 is a front view, side view, and plan view of the kerf structure shown in FIG. 3, FIG. 5 is a drawing showing the dimensions for each part of the kerf structure shown in FIG. 3, and FIG. 6 is perspective views showing the kerf structure for the snow tire shown from various angles, according to an embodiment of the present invention.

Referring to FIGS. 3 to 6, the kerf structure for snow tire according to the present invention includes a wave-shaped straight portion 10 and an expansion portion 20, 20' formed expanding from the straight portion 10, and the expansion portion 20,20' is formed by continuously connecting the unit structures K, K' in which the central semi-sphere holes 22, 22' and the polygonal shapes 21, 21' around the semi-sphere holes 22, 22' form the protrusions in an opposing direction. In particular, in the kerf structure for the snow tire according to the present invention, the unit structure K consisting of an embossed polygonal shape 21 and an engraved semi-sphere hole 22, and the unit structure K' consisting of an engraved polygonal shape 21' and an embossed semi-sphere hole 22' are arranged alternatively.

The kerf structure for a snow tire according to the present invention has a thickness t1 of the kerf at the straight portion in the range of 0.3 to 4.0 mm and is preferable to prevent the collapse of a block of a tire for a passenger vehicle or truck. In addition, when considering the size of a single block of a tire for a passenger vehicle or truck, the kerf structure may have the thickness t2 of the kerf at an expansion section in the range of 0.5 to 5.0 mm which is 1.1 to 3 times the thickness t1 at the straight portion of the kerf.

In the kerf structure for the snow tire according to the present invention, it is preferable that the diameter D1 of the semi-sphere hole is in the range of 1 to 10 mm and the length d1 of the polygonal section is in the range of 2 to 15 mm in order to secure the interlocking effect of the semi-sphere hole and the polygonal protrusion. A polygon-shaped portion of the kerf structure is formed to be inclined toward the semi-sphere hole in the center, here, the slope a1 of the polygon-shaped portion may be 10 to 70° to prevent a biting phenomenon by the kerf while the tire is manufactured.

Figure 7:
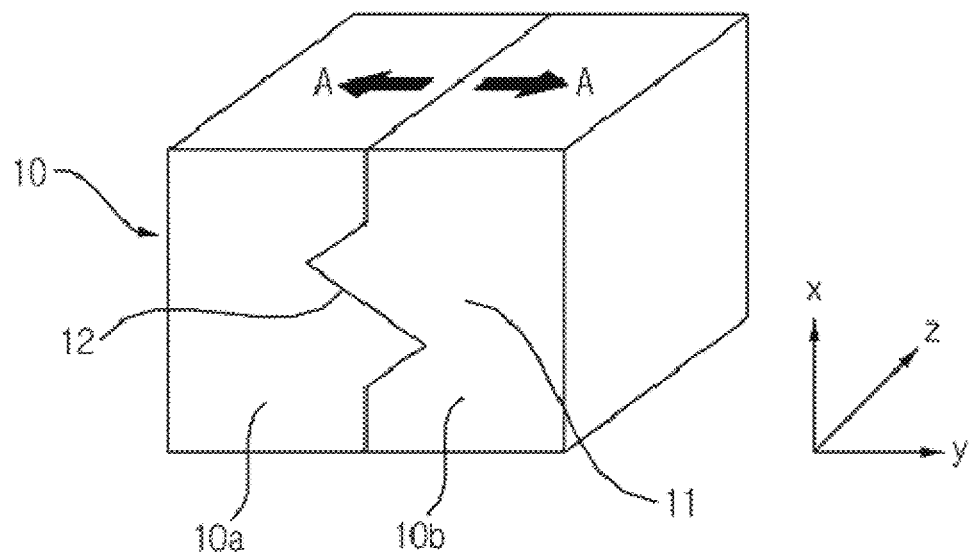
FIG. 7 is diagram showing the problem of a conventional 3D kerf shape.

The kerf structure for a snow tire according to the present invention, as described with the configuration above, is provided with a symmetric shape which can secure uniform block rigidity regardless of the direction of the kerf. In other words, as illustrated in FIG. 7, according to the conventional shape of the 3D kerf, the block rigidity is varied depending on the direction of the tire in motion. However, according to the kerf structure of the present invention the side thereof has a symmetric shape, enabling to secure uniform block rigidity regardless of the direction.

Figure 8:
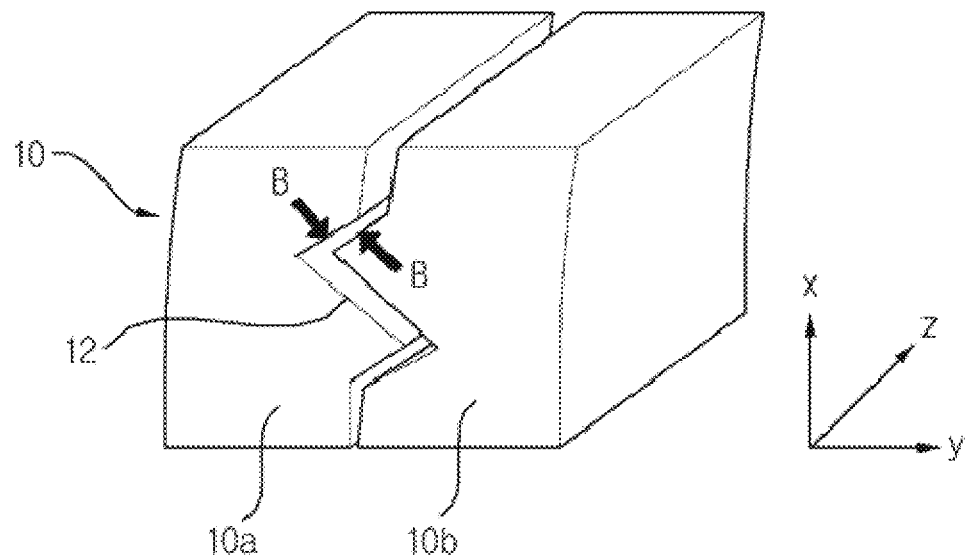
FIG. 8 is diagram showing the interlocking effect of a conventional 3D kerf shape.

In addition, when a force is applied to a three dimensional kerf 12 in an arrow A direction depending on the running of a tire in FIG. 7, as illustrated in FIG. 8, the shape of the conventional 3D kerf 12 shows an insignificant effect of interlocking between sub-blocks 10a and 10b in an arrow B direction. Whereas, the kerf structure of the present invention can maximize the interlocking effect in a combination of polygon-shaped protrusions and semi-sphere hole shaped embossings. Further, the kerf structure of the present invention can double the binding force formed only in one direction under the conventional kerf since the semi-sphere holes and the polygonal shapes are arranged in the opposite direction to restrict doubly the block.

Accordingly, according to the kerf structure for a snow tire of the present invention the tire performance on dry roads can be ensured by optimizing the collapse of the tire tread portion and the uniform performance of the traction can be maintained until the last stages of tread wear since the polygonal shape is maintained until the last stage of the wear even though the tire is worn.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A kerf structure for a snow tire, comprising:
    a wave-shaped straight portion and an expansion portion formed expanding from the wave-shaped straight portion in a depth direction of the kerf,
    wherein the expansion portion comprises rows of unit structures protruding in opposite directions, wherein each unit structure includes:
        a central semi-sphere portion and a polygon-shaped portion around the semi-sphere portion, a first of the unit structures having an embossed polygon-shaped portion and an engraved semi-sphere portion, and a second unit structure that is adjacent to the first unit structure having an engraved polygonal shape and an embossed semi-sphere portion arranged alternatively in each row of unit structures.

2. The kerf structure for a snow tire in claim 1, wherein a thickness of the kerf at the straight portion is in the range of 0.3 to 4.0 mm.

3. The kerf structure for a snow tire in claim 1, wherein a thickness of the kerf at the expansion section is in a range of 0.5 to 5.0 mm which is 1.1 to 3 times the thickness of the kerf at the straight portion.

4. The kerf structure for a snow tire in claim 1, wherein a diameter of the semi-sphere portion is in a range of 1 to 10 mm and a length of the polygon-shaped portion is in a range of 2 to 15 mm.

5. The kerf structure for a snow tire in claim 1, wherein the polygon-shaped portion of the kerf structure is formed to be inclined toward the central semi-sphere portion, where the slope of the kerf at the polygon-shaped portion is in a range of 10° to 70°.

* * * * *